Figure 1:
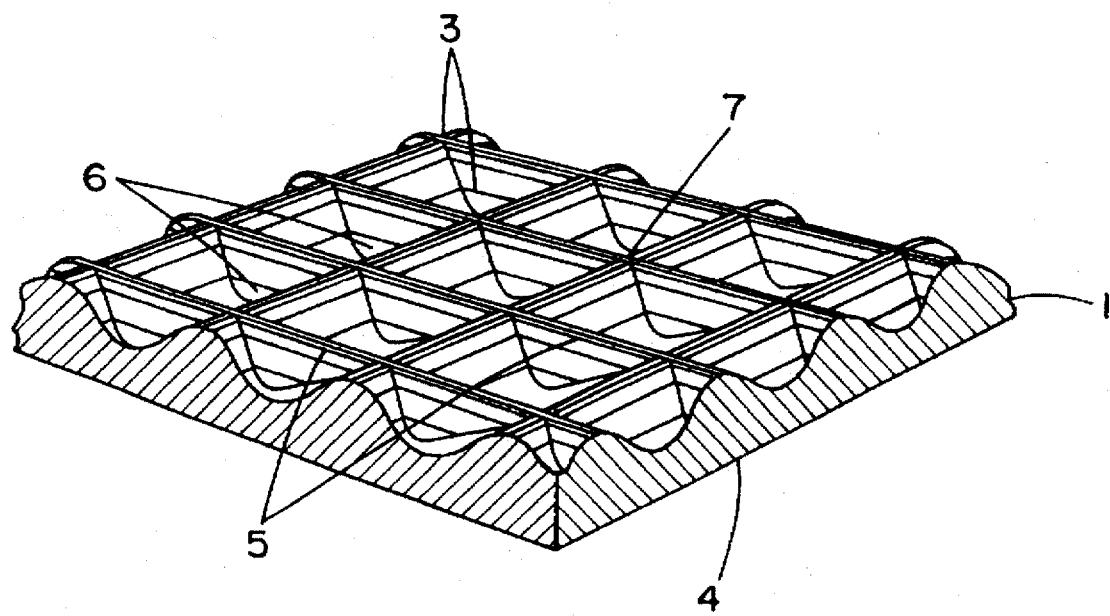

United States Patent [19]
Kristoffersson

[11] Patent Number: 5,685,452
[45] Date of Patent: Nov. 11, 1997

[54] CONTAINER BOTTOM WITH ELEVATIONS MADE OF A POLYMERIC MATERIAL AND A PROCESS FOR PRODUCTION THEREOF

[75] Inventor: Karl-Gustaf Kristoffersson, Orkelljunga, Sweden

[73] Assignee: Perstorp AB, Perstorp, Sweden

[21] Appl. No.: 416,832

[22] PCT Filed: Sep. 27, 1993

[86] PCT No.: PCT/SE93/00774
    § 371 Date: May 18, 1995
    § 102(e) Date: May 18, 1995

[87] PCT Pub. No.: WO94/08853
    PCT Pub. Date: Apr. 28, 1994

[30] Foreign Application Priority Data

Oct. 21, 1992 [SE] Sweden .................. 9203079

[51] Int. Cl.⁶ .................................. B23B 3/28
[52] U.S. Cl. ............................. 220/608; 220/607
[58] Field of Search ...................... 220/625, 607, 220/608, 623, 516, 517, 518, 519; 206/201, 203

[56] References Cited

U.S. PATENT DOCUMENTS

| | | | |
|---|---|---|---|
| 2,535,493 | 12/1950 | Gerber | 220/516 X |
| 3,160,306 | 12/1964 | Smalley | 206/203 X |
| 3,246,790 | 4/1966 | Martin . | |
| 3,281,010 | 10/1966 | Moore et al. | 206/203 |
| 3,351,228 | 11/1967 | Huisman | 220/607 |
| 3,361,292 | 1/1968 | Huisman | 220/607 X |
| 3,392,875 | 7/1968 | Bockenstette | 220/607 X |
| 3,403,834 | 10/1968 | Donovan et al. | 220/608 X |
| 3,443,717 | 5/1969 | Wettlen et al. | 220/607 |
| 3,485,434 | 12/1969 | Donovan et al. | 220/608 X |
| 3,638,824 | 2/1972 | Sekiguchi et al. | 220/519 |
| 3,744,665 | 7/1973 | Spoto | 220/519 |
| 3,762,594 | 10/1973 | Utz | 220/516 |
| 3,841,519 | 10/1974 | Stromberg . | |
| 4,140,828 | 2/1979 | Copping | 220/608 X |
| 4,162,738 | 7/1979 | Wright | 220/519 |
| 4,410,099 | 10/1983 | deLarosiere | 220/519 X |
| 4,588,087 | 5/1986 | Swingley, Jr. | 220/519 X |
| 5,031,761 | 7/1991 | de Larosiere | 206/203 |

OTHER PUBLICATIONS

S.E. Sorelius, "Tekno's Plastteknik", published 1973, by Teknografiska institutet (Stockholm) pp. 202 to 203.

*Primary Examiner*—Steven M. Pollard
*Attorney, Agent, or Firm*—Scully, Scott, Murphy & Presser

[57] ABSTRACT

Bottom (1) to a container, box, basket, barrel, cask or the like (8) made of a polymeric material and preferably produced by injection moulding. Material thickening and essentially scalloped, jagged and/or wave-like elevations (5) constitute an integrated part of the upper (3) and/or lower (4) surface of the bottom (1). The height (FIG. 12, A–B) of the elevations (5) is 0.5–20 mm representing at least 20% of the maximum thickness of the bottom (1). Intervening spaces (6) are formed between the material thickening elevations (5). A container (8) including a bottom (1) is produced by injection moulding and is cooled in the mould in such a way that the elevations (5) hold a core temperature exceeding the surface temperature to such an extent that the core shrinkage is larger than the surface shrinkage. A strong inner tensile stress is obtained, whereby the elevations (5) work as pretensioned reinforcing bars.

21 Claims, 6 Drawing Sheets

CONTAINER BOTTOM WITH ELEVATIONS MADE OF A POLYMERIC MATERIAL AND A PROCESS FOR PRODUCTION THEREOF

The present invention relates to certain improvements with regard to a bottom intended to form an integrated part of a container, box, basket, barrel, cask or the like made of a polymeric material. The invention also comprises a process for production of a container etc., which container includes such a bottom and which is produced by injection moulding.

Bottoms of plastic containers, boxes, baskets, barrels, casks or the like, when demands on strength and stability are called for, are most often provided with reinforcing means, such as webs, ribs, beams, girders and the like, normally placed on or forming an integrated part of the lower surface of the bottom. These types of reinforcing means give, in relation to obtained degree of reinforcement and rigidity, a large build-up of the container height why adjustments of the number and type of reinforcing means to desired degree of reinforcement, rigidity and/or stability often results in unnecessary high containers related to the loading capacity. Containers reinforced as above are, furthermore, unsuitable or even impossible to use with transport tracks such as ball and roller beds, conveying belts and the like. Containers run an obvious and very high risk of jamming with the tracks or getting caught in each other. Further disadvantages using webs, ribs, beams, girders and the like as above are that such means easily get soiled and are inaccessible to a thorough cleaning.

Reinforcing means, such as webs, ribs, beams, girders and the like can also be placed or constitute an integrated part of the upper surface of a bottom. This does, however, not solve discussed problems, with an exception for the use with transport tracks such as ball and roller beds, conveying belts and the like. The inner loading capacity is reduced unless the height of the container is increased and loaded goods run, during loading, transport and/or emptying, the risk of getting caught in said means. The latter is especially striking when the goods consist of screws, screw nuts, electronic components and other small unwrapped items. The cleaning inaccessibility becomes, furthermore, a more pronounced problem. A clean inner side is of a higher importance than a clean outer side.

Through the present invention a bottom forming an integrated part of plastic containers, boxes, baskets, barrels, casks or the like, without reinforcing means, such as webs, ribs, bees, girders and/or the like has been brought about. The bottom, which complies with high demands for strength and stability, is preferably produced by injection moulding of a polymeric material such as polyethylene or polypropylene. The bottom according to the present invention is characterised in that material thickening and essentially scalloped, jagged and/or wave-like parallel and/or divergent elevations of equal and/or varying width constitute an integrated part of the upper and/or lower surface of the bottom. The height of the material thickening elevations is 0.5–20 mm, preferably 1–5 mm, and the material thickening elevations are separated from each other by square, rectangular, triangular and/or rhomboid intervening spaces. The height of the material thickening elevations represent at least 20% and preferably at most 75%, of the maximum thickness of the bottom.

In one embodiment of the invention, the upper surface and/or the lower surface wholly or partly hold material thickening elevations intersecting in two or more directions, thus forming concave, convex or right angles at the intersections According to preferred embodiments, the material thickening elevations constitute an integrated part of the upper surface while the lower surface of the bottom principally is levelled All material thickening elevations and intervening spaces are, preferably, bevelled and the material thickening elevations can, independently, either be solid and/or wholly or partly include hollow channels.

The process for producing a container, box, basket, barrel, cask or the like, which container comprises a bottom as disclosed above involves injection moulding of a polymeric material. The process is characterised in that a polymeric material from which for instance a transport container has been produced, is cooled in a mould in such a way that the material thickening elevations, when the container is ejected from the mould, hold a core temperature exceeding the surface temperature to such an extent that a core shrinkage larger than corresponding surface shrinkage is obtained. The result from the shrinkage disparity is a strong inner tensile stress, whereby the material thickening elevations act as pretensioned reinforcing bars. The difference in core and surface shrinkage may result in hollow channels inside the material thickening elevations, which does not influence the tensile stress or properties derived therefrom.

The ratio between the surface and the core temperature of the material thickening elevations is preferably 1:2–3 and suitable polymeric materials are for example polyolefines such as polyethylene and polypropylene. The surface temperature (as defined above) for polyethylene and polypropylene, if measured immediately after ejection from the mould, is normally within the range of 20–80° C. The surface temperature will thereafter, due the higher core temperature, in most cases raise somewhat.

The process according to the present invention can, besides for production of above disclosed bottom, also be used to produce side walls, end walls, lids and the like to boxes, containers, baskets, barrels, casks and the like, resulting in for instance transport and storage containers having a very high degree of stability and rigidity.

A bottom according to the present invention exhibits, despite the lack of reinforcing means, such as webs, ribs, beams, girders and/or the like, a high degree of strength, stability and rigidity in relation to the comparatively low height of the material thickening elevations and the maximum material thickness of the bottom. The strength, stability and rigidity can easily be adjusted to various demands by varying the height, width and number of material thickening elevations, the maximum material thickness of the bottom and/or the area occupied by intervening spaces. The location of the material thickening elevations, i.e. as an integrated part of the upper and/or lower surface of the bottom, does not influence the degree of strength, stability and rigidity.

The built-in strong tensile stress in the material thickening elevations results in a bottom having a much higher degree of rigidity, than would be obtained with a correspondingly designed bottom without such an inner tensile stress.

The material thickening elevations partly reinforce the bottom, partly counteract adhesive forces such as static charging, underpressure, for instance as a result of two plane surfaces placed towards each other, surface tensions or the like.

The preferred embodiment according to which the material thickening elevations form an integrated part of the upper surface of the bottom while the lower surface principally is leveled, provides containers etc. very suitable for use with transport tracks such as ball and roller beds, conveying belts and the like. The risk of containers jamming with the tracks or getting caught in each other is very low or non-existent. The upper surface of the bottom with its material thickening elevations has, due to the comparatively low height of these, an insignificant influence on the inner loading capacity.

Bevelled material thickening elevations and intervening spaces reduces or eliminates i.a. cleaning inaccessibilities and creates a smoother surface that is more pleasing to goods and handling.

In embodiments holding material thickening elevations as an integrated part of the lower surface of the bottom, the influence on the use with transport tracks, such as ball and roller beds, conveying belts and the like, is substantially lower than is experienced with reinforcing means, such as webs, ribs, beams, girders and the like.

The invention is further illustrated by enclosed figures, wherein

FIG. 1 shows diagonally from above a cross-section of an embodiments of a bottom 1 according to the invention. Massive essentially scalloped and bevelled material thickening elevations 5 constitute an integrated part of the upper side 3 of the bottom 1. The material thickening elevations 5 intersect in two directions, thus forming intersections 7 and square intervening spaces 6. The lower side 4 of the bottom 1 is levelled.

Figure 2:
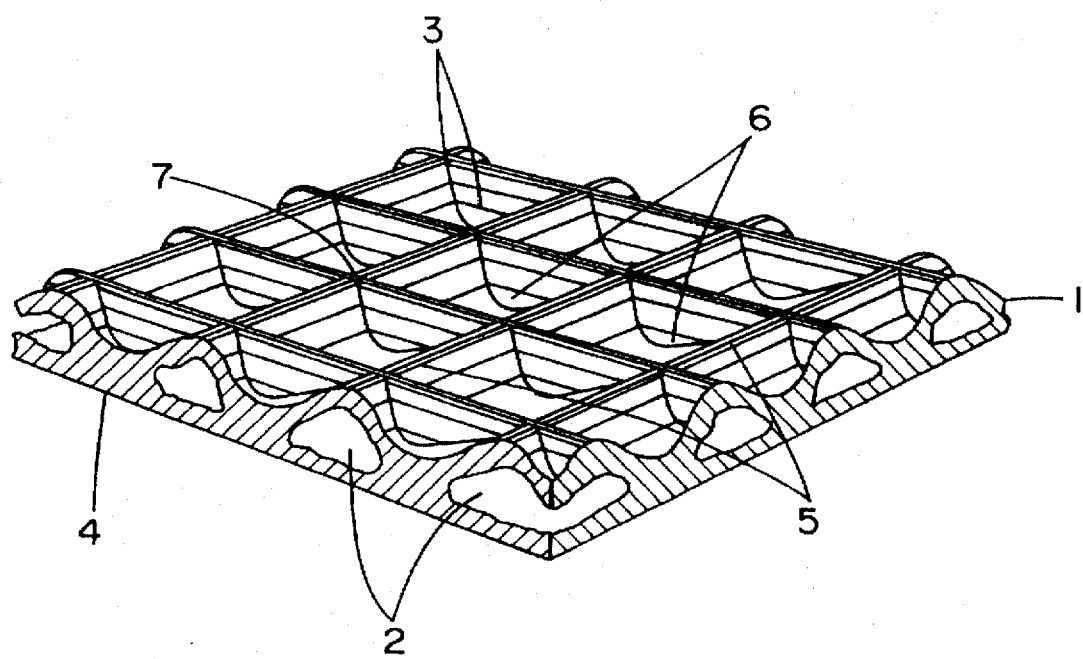
Figure 3:
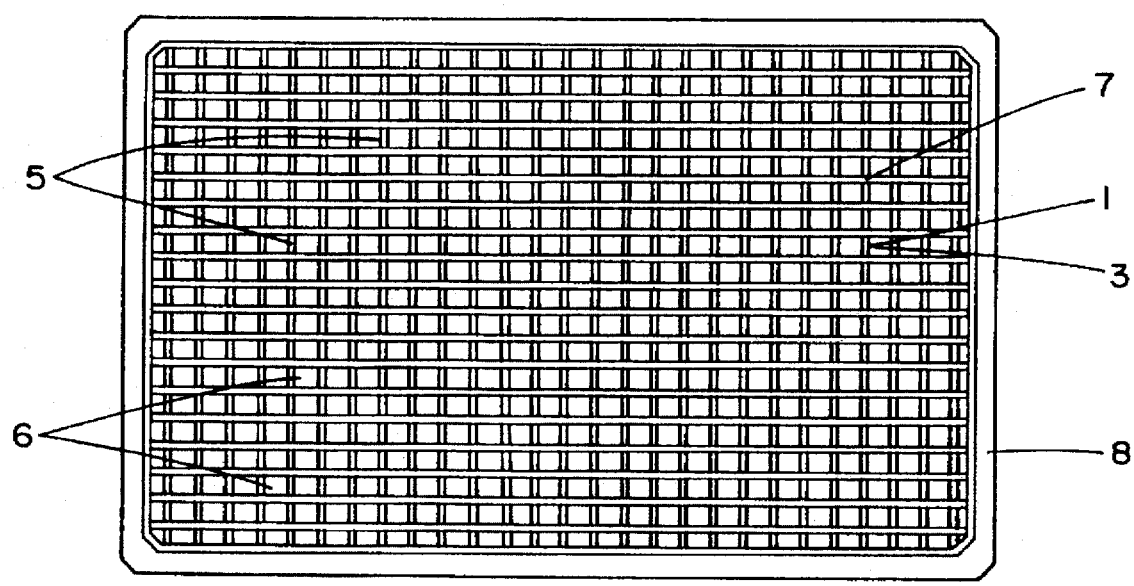
Figure 4:
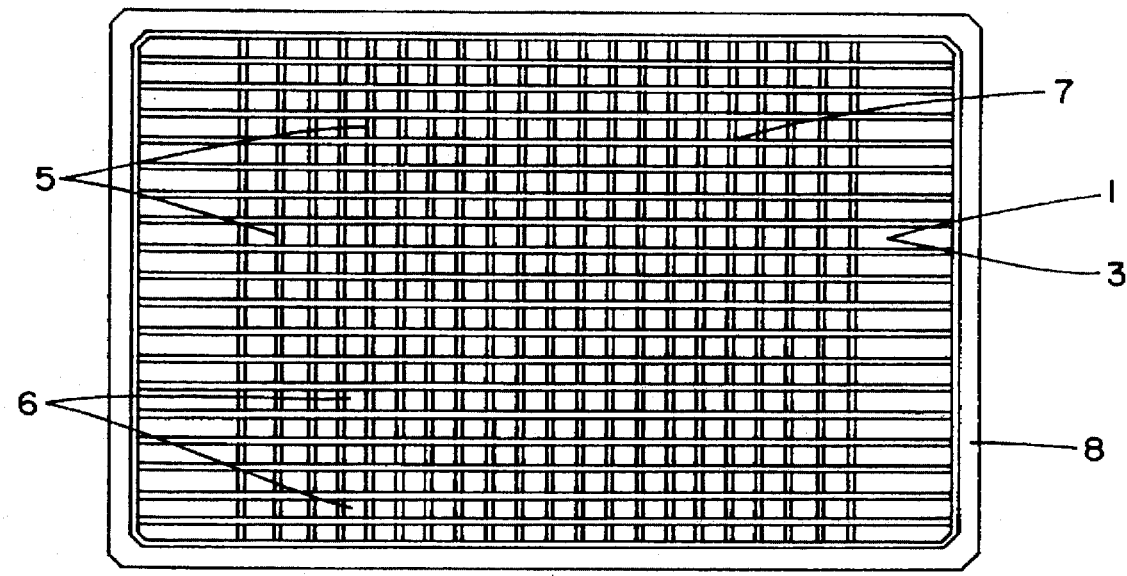
Figure 5:
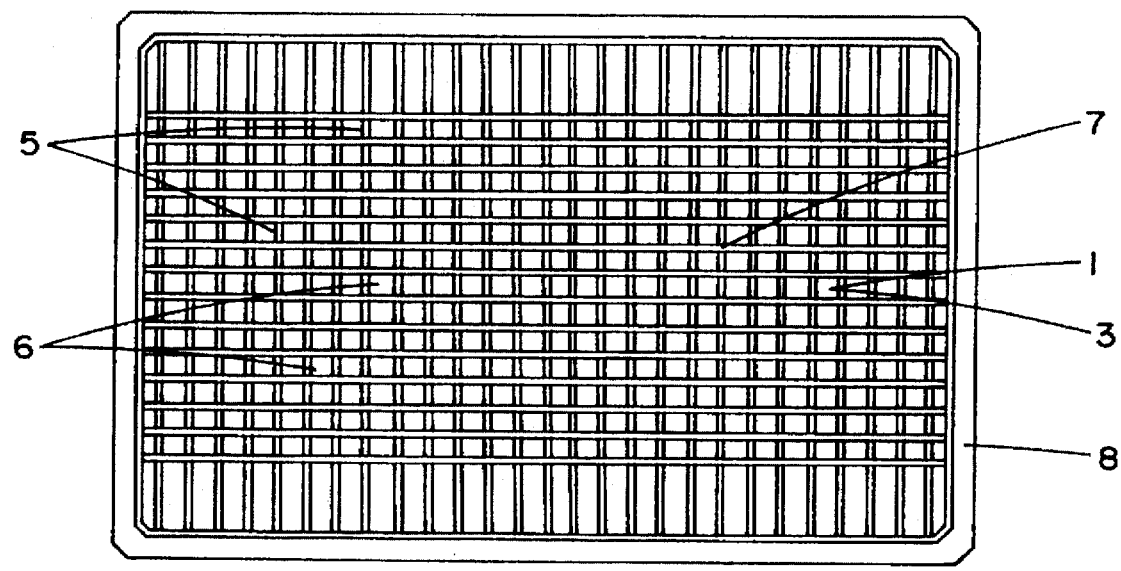
Figure 6:
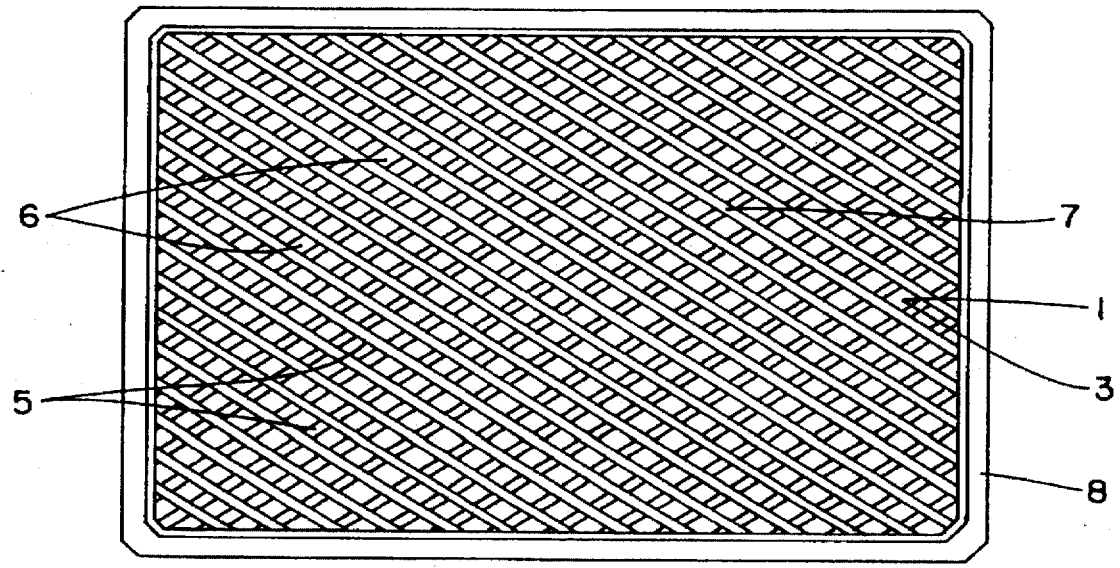
Figure 7:
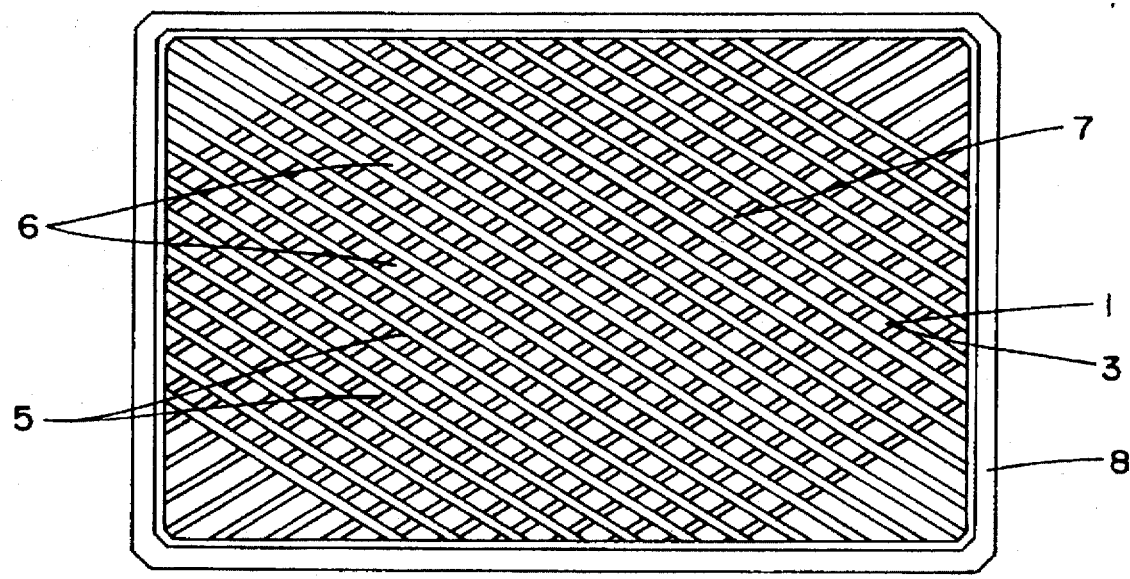
Figure 8:
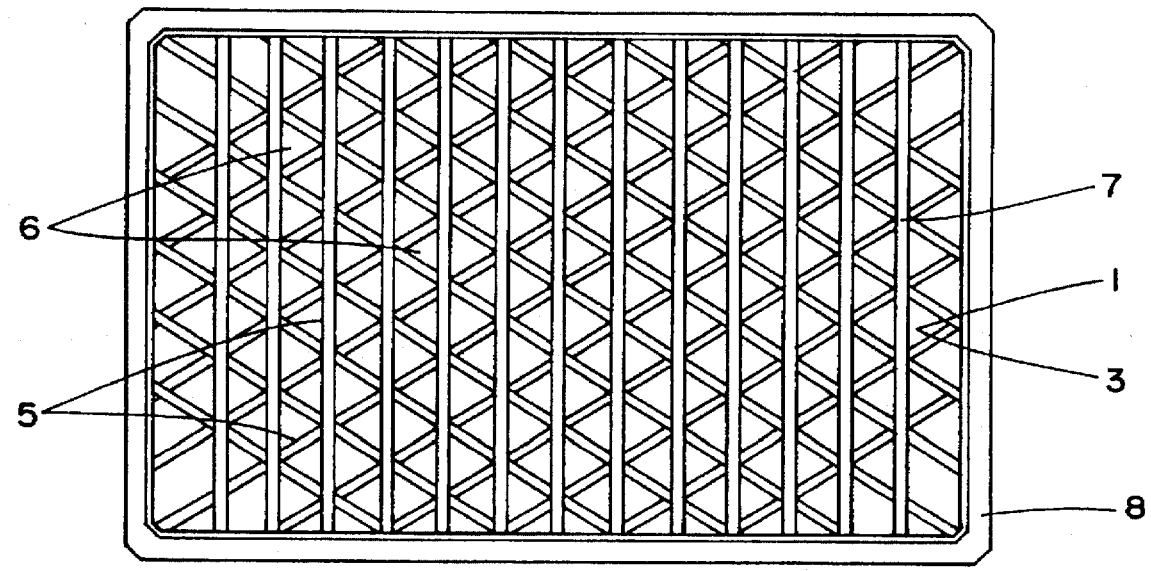

FIG. 2 shows an embodiment that from above and below is equal to the one shown in FIG. 1. The material thickening elevations 5 in this embodiment hold hollow longitudinal channels 2.

Figure 9:
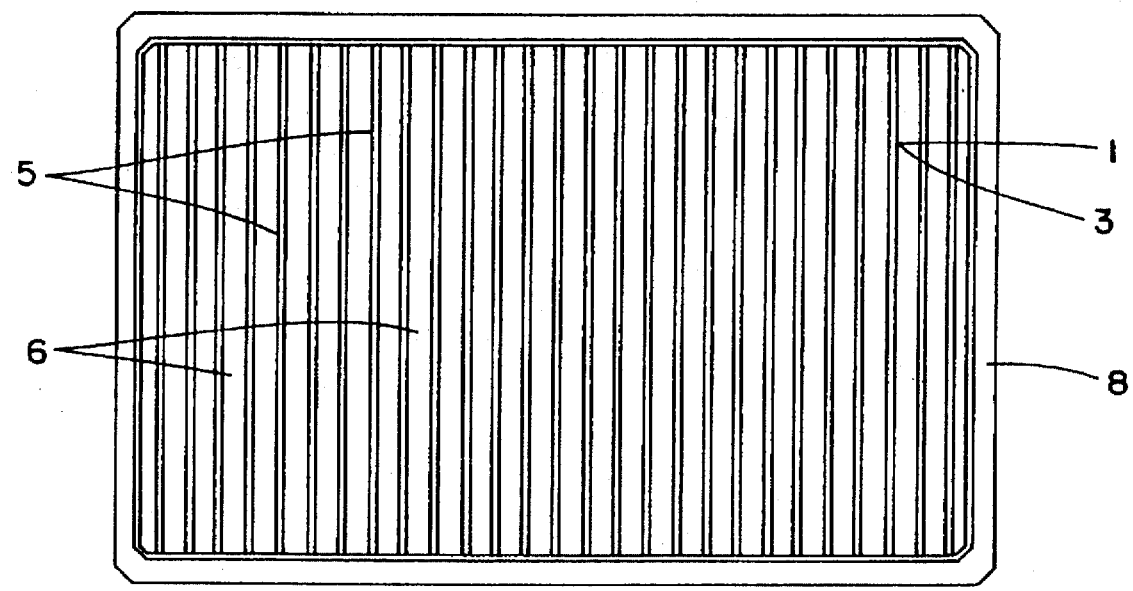
Figure 10:
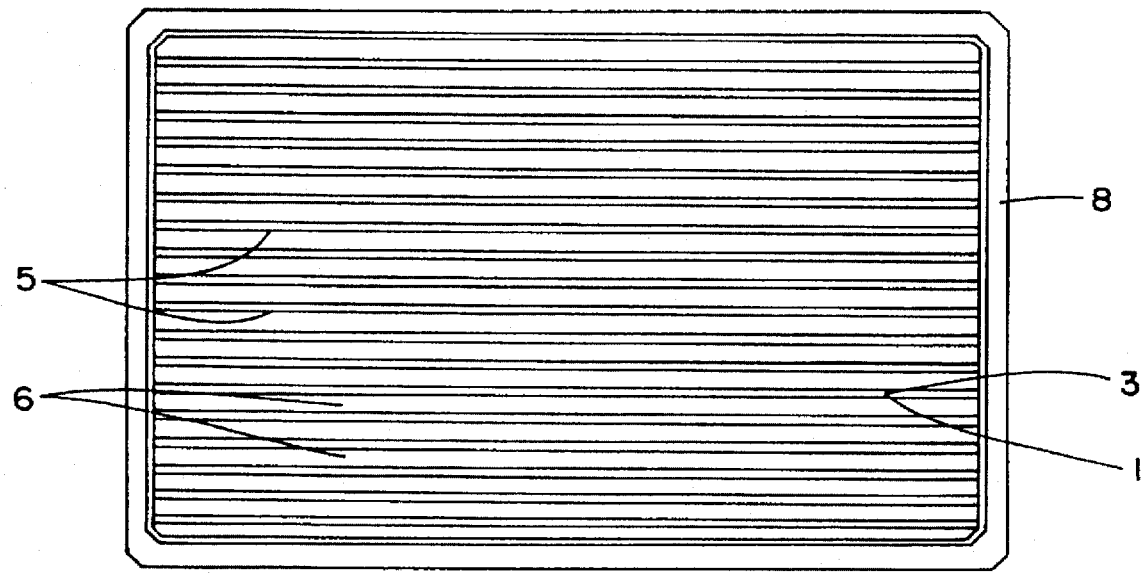
Figure 11:
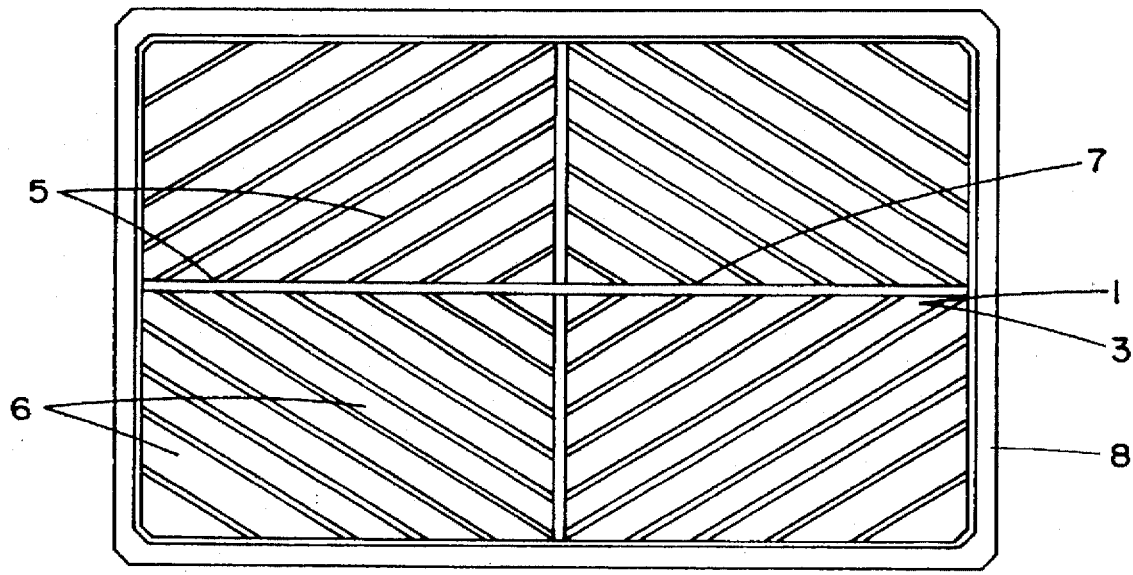

FIGS. 3–11 show from above outlined nine containers 8 which each include an embodiment of a bottom 1 according to the invention. Material thickening elevations 5 constitute an integrated part of the upper surfaces 3 of the bottoms 1. FIGS. 3–8 and 11 show embodiments holding material thickening elevations 5 intersecting in two or more directions, thus forming intersections 7 and intervening spaces 6 of varying design. FIGS. 9 and 10 show embodiments in which the material thickening elevations 5 are unidirectional with rectangular intervening spaces 6.

Figure 12:
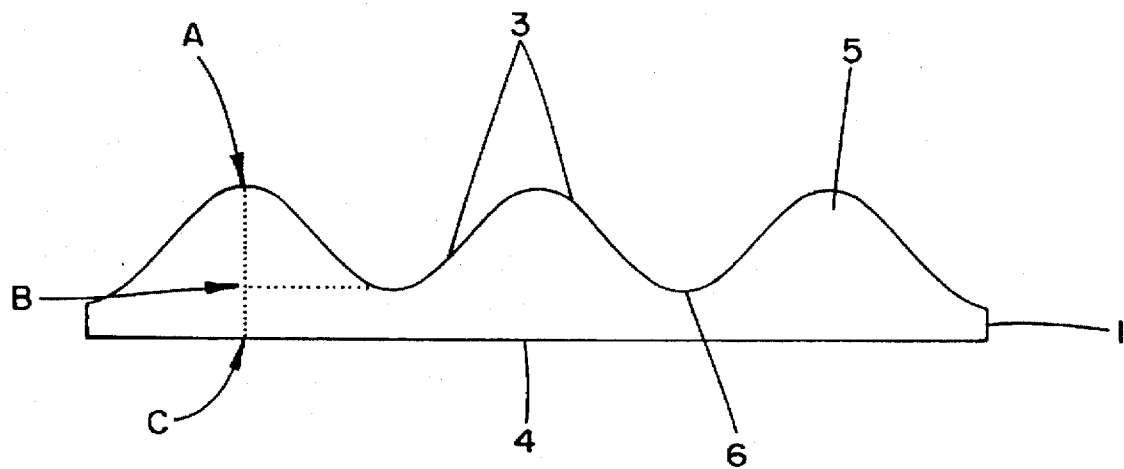

FIG. 12 show in side view schematically a cross-section of an embodiment of a bottom 1 having wave-like and bevelled material thickening elevations 5 and intervening spaces 6, both constituting integrated parts of the upper surface 3. The lower surface 4 is levelled. The height A–B of the material thickening elevations 5 and the maximum thickness A–C of the bottom 1 are indicated by the dotted lines.

I claim:

1. A bottom comprising an integrated part of a container which is constituted of a polymeric material, wavylinear beveled material thickening elevations and widths constituting an integrated part of the upper surface of the bottom, each said material thickening elevation including a core constituting a pretensioned reinforcing bar responsive to an internal stress generated through a differential between a core shrinkage and a surface shrinkage derived during cooling of the polymeric material during molding thereof in which a core temperature exceeds a surface temperature, a lower surface of said bottom being planar and the core shrinkage being greater than that the corresponding surface of the material of the thickening elevations, whereby the shrinkage differential results in generating high internal tensile stresses such that the material thickening elevations resultingly produce said pretensioned reinforcing bars.

2. The bottom according to claim 1, wherein said material thickening elevations intersect in at least two directions, the height of said thickening elevations being in the range of about 0.5–20 mm and at least about 20% the maximum thickness of said bottom, and intervening spaces being formed between the material thickening elevations.

3. The bottom according to claim 1, wherein the polymeric material is a polyolefin selected from the group of materials consisting of polyethylene and polypropylene.

4. The bottom according to claim 1, wherein specified angles are formed at the intersections of the material thickening elevations.

5. The bottom according to claim 4, wherein said angles comprise acute angles.

6. The bottom according to claim 4, wherein said angles comprise obtuse angles.

7. The bottom according to claim 4, wherein said angles comprise right angles.

8. The bottom according to claim 1, wherein said material thickening elevations and intervening spaces are beveled.

9. The bottom according to claim 1, wherein the material thickening elevations are solid in cross-section.

10. The bottom according to claim 1, wherein said material thickening elevations are at least partly provided with hollow channels.

11. The bottom according to claim 1, wherein said polymeric material comprises an injection-molded plastic material.

12. The bottom according to claim 1, wherein said material thickening elevations are selectively scalloped, jagged, wavylinear, parallel and divergent in shape.

13. The bottom according to claim 1, wherein said material thickness elevations are of equal widths.

14. The bottom according to claim 1, wherein said material thickness elevations are of varying widths.

15. The bottom according to claim 1, wherein the intervening spaces between said material-thickness elevations are selectively square, rectangular, triangular and rhomboid in shape.

16. The bottom according to claim 1, wherein the height of the material thickening elevations is within the range of about 1.0–5.0 mm.

17. The bottom according to claim 1, wherein the height of the material thickness elevations does not excess 75% of the maximum thickness of the bottom.

18. The bottom according to claim 1, wherein said container is adapted to form a box, basket, barrel and cask.

19. A bottom according to claim 1, wherein the polymeric material of which the container is produced, is cooled in a mold so that the material thickening elevations, when the container is ejected from the mold, hold a core temperature exceeding a corresponding surface temperature such that a core shrinkage larger than corresponding surface shrinkage is obtained, which shrinkage disparity results in a high internal tensile stress, whereby the material thickening elevations form said pretensioned reinforcing bars.

20. A bottom according to claim 19, wherein the ratio between the surface temperature and the core temperature of the material thickening elevations is about 1:2–3.

21. A bottom according to claim 19, wherein the material thickening elevations hold a surface temperature of between about 20–80° C. when the container is ejected from the mold.

* * * * *